US007644000B1

(12) United States Patent
Strom (10) Patent No.: US 7,644,000 B1
(45) Date of Patent: Jan. 5, 2010

(54) ADDING AUDIO EFFECTS TO SPOKEN UTTERANCE

(75) Inventor: Nikko Strom, Mountain View, CA (US)

(73) Assignee: TellMe Networks, Inc., Mountain View, CA (US)

( * ) Notice: Subject to any disclaimer, the term of this patent is extended or adjusted under 35 U.S.C. 154(b) by 695 days.

(21) Appl. No.: 11/319,447

(22) Filed: Dec. 29, 2005

(51) Int. Cl.
G10L 11/00 (2006.01)
G10L 21/00 (2006.01)

(52) U.S. Cl. .................. 704/278; 704/270; 704/251

(58) Field of Classification Search .......... 704/256, 704/243, 270.1, 270, 249, 275, 277, 260, 704/258, 278; 379/88.22
See application file for complete search history.

(56) References Cited

U.S. PATENT DOCUMENTS

| 5,327,521 | A | * | 7/1994 | Savic et al. ............ 704/272 |
| 5,915,001 | A | * | 6/1999 | Uppaluru ............. 379/88.22 |
| 5,960,447 | A | * | 9/1999 | Holt et al. ............... 715/201 |
| 6,334,104 | B1 | * | 12/2001 | Hirai ..................... 704/258 |
| 6,622,121 | B1 | * | 9/2003 | Crepy et al. ............ 704/243 |
| 6,643,620 | B1 | * | 11/2003 | Contolini et al. ........ 704/270 |
| 2003/0233238 | A1 | * | 12/2003 | Creamer et al. ....... 704/270.1 |
| 2005/0065778 | A1 | * | 3/2005 | Mastrianni et al. .... 704/200.1 |
| 2006/0149558 | A1 | * | 7/2006 | Kahn et al. ............. 704/278 |
| 2006/0190263 | A1 | * | 8/2006 | Finke et al. ............. 704/270 |

OTHER PUBLICATIONS

Daniel C. Burnett et al., "Speech Synthesis Markup Language (SSML) Version 1.0", W3C Recommendation Sep. 7, 2004, pp. 1-48, http://www.w3.org/TR/2004/RCE-speech-synthesis-20040907.

* cited by examiner

*Primary Examiner*—Talivaldis I Smits
*Assistant Examiner*—Farzad Kazeminezhad
(74) *Attorney, Agent, or Firm*—Perkins Coie LLP

(57) ABSTRACT

A system receives a spoken utterance, identifies at least one keyword within the spoken utterance, and identifies a function using the identified at least one keyword. The system further performs the identified function on at least a portion of the spoken utterance to create a voice file.

26 Claims, 6 Drawing Sheets

FIG. 3

| AUDIO FILE WITH EMBEDDED KEYWORDS |

FIG. 4A

| AUDIO FILE WITH EMBEDDED KEYWORDS REMOVED |

| META TAG FILE |

FIG. 4B

| AUDIO FILE WITH EMBEDDED KEYWORDS |

| META TAG FILE |

FIG. 4C

| PROCESSED AUDIO FILE WITH KEYWORD FUNCTION APPLIED |

ADDING AUDIO EFFECTS TO SPOKEN UTTERANCE

FIELD OF THE INVENTION

Implementations consistent with the principles of the invention relate generally to processing of spoken utterances and more specifically to identifying keywords in audio recordings of spoken utterances and processing the recorded audio based upon keywords contained within the spoken utterance.

BACKGROUND OF THE INVENTION

It is known in the prior art to have a markup language for written text. For example, the hypertext markup language (HTML) is used in the creation of web pages. In addition, there are markup languages that are associated with voice applications, such as Voice Extended Markup Language. VoiceXML uses the XML format for specifying interactive voice dialogues between a human and a computer. It is analogous to HTML, and brings the same advantages of web application development and deployment to voice applications that HTML brings to visual applications. Just as HTML documents are interpreted by a visual web browser, VoiceXML documents are interpreted by a voice browser. The VoiceXML dialogues are textually created. When a user accesses the voice browser and begins a dialogue, the computer accesses the VoiceXML document and the computer responds using a text-to-speech (TTS) application to provide the dialogue to the user. The speech of the user does not contain any additional commands nor does VoiceXML allow the user to insert commands for later processing of the user's spoken utterance by the computer. VoiceXML does include an audio tag <audio>. The audio tag allows the playing of an audio sound file in the voice application. This audio tag is not spoken, but is inserted in the VoiceXML dialogues.

SSML is a markup language used in speech synthesis. SSML is part of a larger set of markup specifications for voice browsers developed through the open processes of the W3C. It is designed to provide a rich, XML-based markup language for assisting the generation of synthetic speech in Web and other applications. The essential role of the markup language is to give authors of synthesizable content a standard way to control aspects of speech output such as pronunciation, volume, pitch, rate, etc. across different synthesis-capable platforms. As with VoiceXML, SSML is a text based markup language.

SUMMARY OF THE INVENTION

In an implementation consistent with the principles of the invention, a method for creating a voice file is provided. The method includes receiving a spoken utterance; performing speech recognition on at least part of the spoken utterance to identify at least one keyword within the spoken utterance, the at least one keyword being associated with a function; and performing the function on at least a portion of the spoken utterance to create a voice file.

In another implementation consistent with the principles of the invention, a method of creating a meta tag file associated with a spoken voice signal is provided. The method includes receiving a spoken utterance; identifying at least one keyword within the spoken utterance using speech recognition; identifying a temporal position of the at least one keyword in the spoken utterance; and creating a meta tag file, the meta tag file including an identifier of the temporal position and an identifier of the at least one keyword.

In yet another implementation consistent with the principles of the invention, a method for processing a spoken utterance is provided. The method includes receiving a spoken utterance; identifying an opening keyword and a closing keyword within the spoken utterance, the opening and closing keywords being associated with a function; and executing the function so as to change at least one audible characteristic of a portion of the spoken utterance temporally located between the opening and closing keywords.

In still another implementation consistent with the principles of the invention, a method includes receiving an audio file, where the audio file includes a first keyword, a second keyword, and an audio portion located between the first keyword and the second keyword; removing the first keyword and the second keyword from the audio file; identifying a function based on the first keyword and the second keyword; and performing the function on the audio portion to create a new audio file.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention allow a user to verbally add keywords and phrases corresponding to specific audio-related effects to a spoken utterance, so that, upon playback, the effects occur in the audio.

Figure 1:
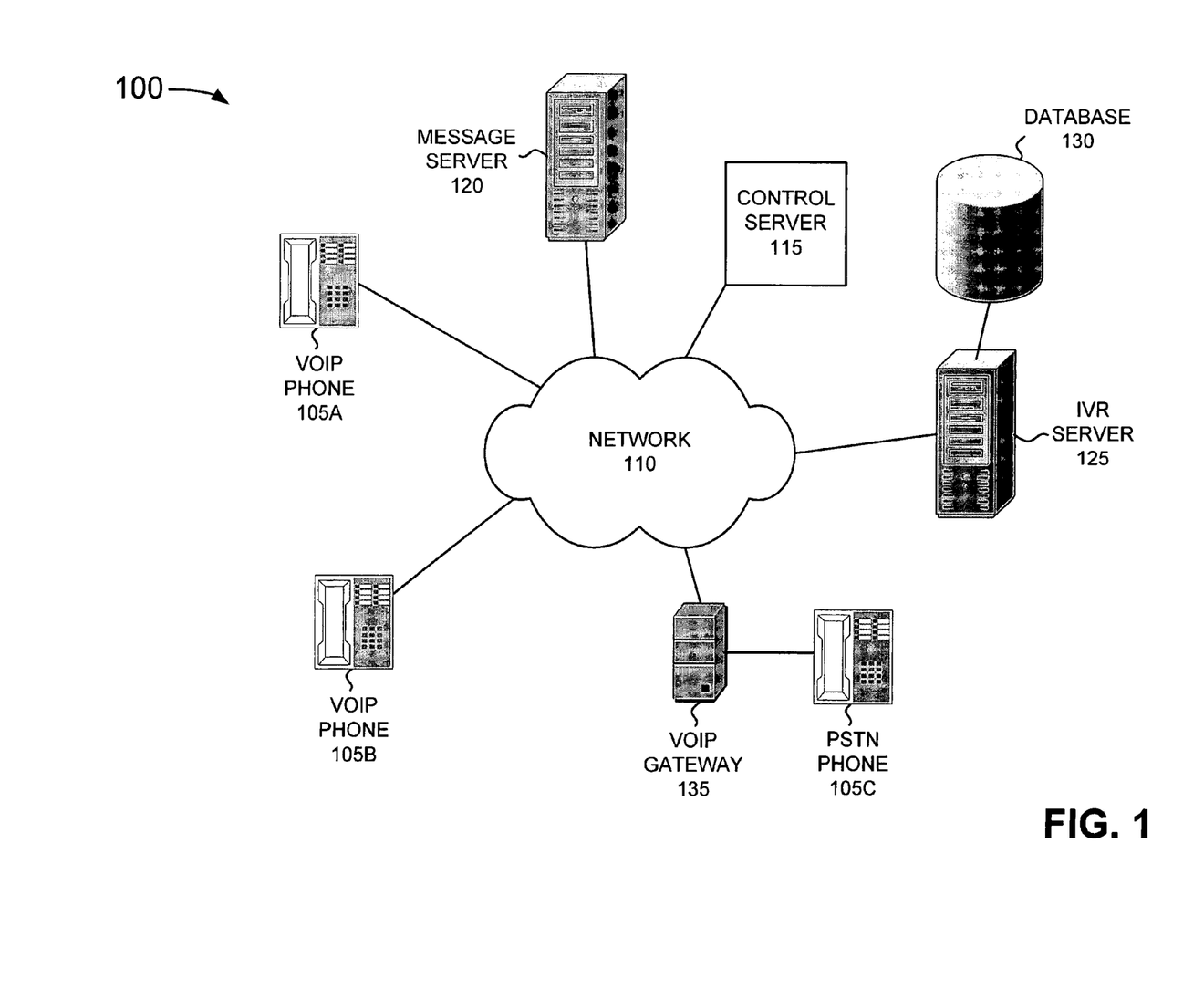
FIG. 1 shows an environment for implementing one embodiment of the present invention.

FIG. 1 shows a network environment 100 compatible with embodiments of the invention. As illustrated, environment 100 may include a shared telephony network 110 that provides telephone-related services to a group of telephone users. Shared telephone network 110 may include a control server 115, a message server 120, and an interactive voice recognition (IVR) server 125. IVR server 125 may be associated with a database 130. The components of shared telephone network 110 may be located at remote locations, but are logically connected and can communicate through other networks, such as a data network using communication protocols, including IP (Internet Protocol), SIP (Session Initiation Protocol), and RTP (Real Time Protocol). In other embodiments, the telephony network components may be located at the same location where functionality of message server 120, interactive voice recognition server 125, and control server 115 may be combined into a single entity. In other embodiments, there may be a group of shared telephony networks where calls and messages are passed between the telephony networks.

When a user picks up his phone and goes off hook using a VOIP phone, such as VOIP phone 105A or 105B, or a PSTN phone, such as PSTN phone 105C, that passes through a VOIP gateway 135, the phone/gateway signals control server 115 of telephony network 110. Control server 115 may allocate resources from interactive voice recognition server 125 and message server 120 in response to this signaling.

Control server 115 may direct the call to interactive voice recognition server 125 allowing the user to interact with a voice response system. The user can choose to review missed calls and messages, configure the voice response program, place a call to another party, or leave a message for another party. If the user decides to record a message either for another party, as a greeting message, or as part of a voice blog, interactive voice recognition server 125 receives the spoken message defining an audio file. In one implementation consistent with the principles of the invention, interactive voice recognition server 125 may search through the data forming the audio file of the spoken message for keywords. The keywords may identify sounds either to be inserted into the spoken message upon playback or allow for delineating a portion of the spoken message on which signal processing may be performed. It should be recognized that the term file can imply data that is stored in memory or data forming a spoken utterance that is processed in real-time with or without the data being saved to memory.

In certain embodiments, interactive voice recognition server 125 may process the audio file and then pass the processed audio signal to message server 125. Message server 120 may save the message in an appropriate location. For example, if the user is leaving a message for a recipient, the message will be associated with the profile for the recipient and stored in an appropriate location for later retrieval by the recipient.

In embodiments in which there is a group of telephony networks, the audio file message may be passed from a first telephony network to a second telephony network that is associated with the recipient. The second telephony network may save the message to a location accessible by the recipient. Thus, a user may create messages in a first location having a first set of resources for creation and send the message to a second location having a second set of resources that may be different from the first set of resources for processing and playback of the message.

Figure 2:
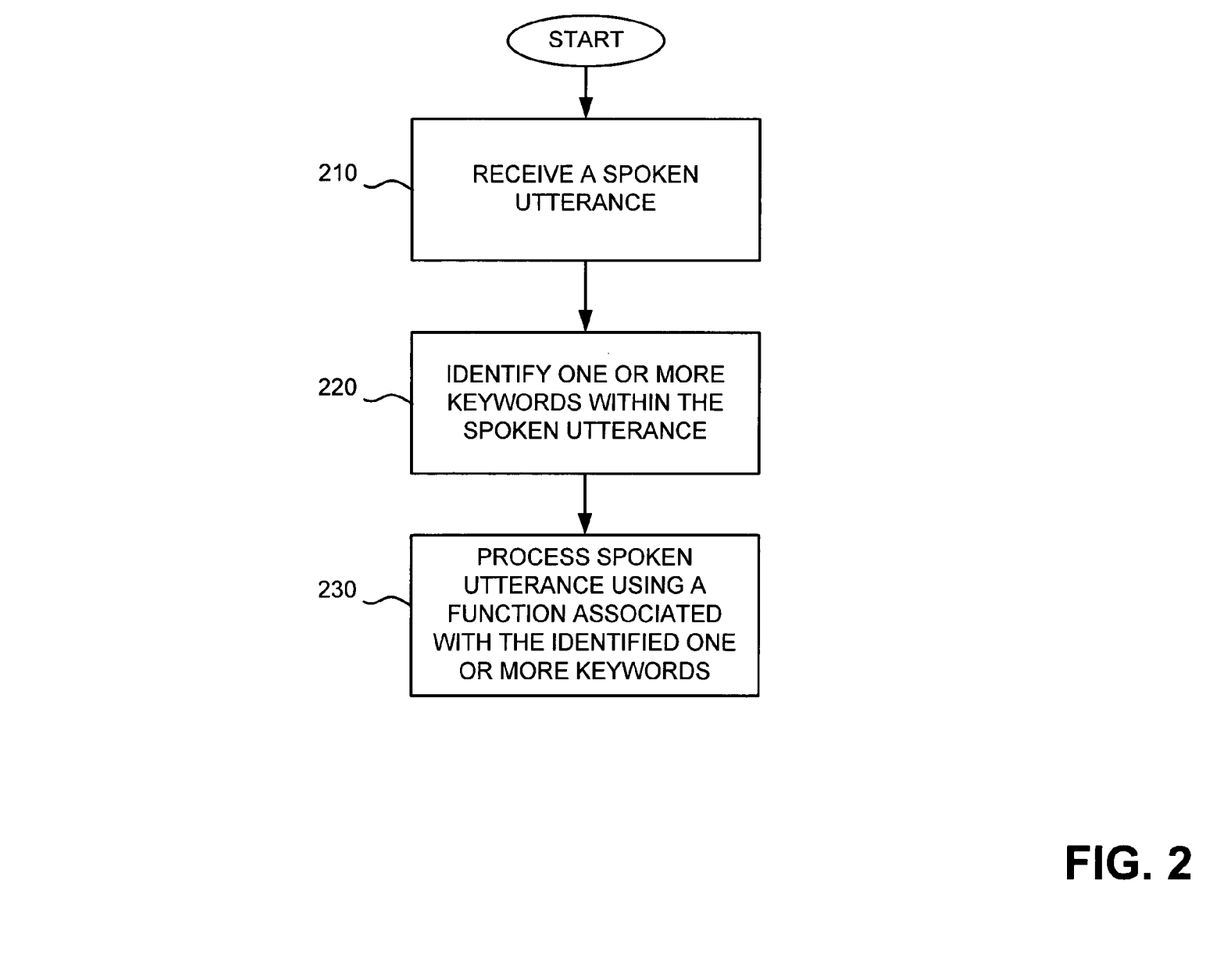
FIG. 2 shows a flow chart for one embodiment of the invention.

FIG. 2 shows a flow chart for one embodiment of the invention. Processing may begin with voice recognition server 125 receiving a spoken utterance from a user (act 210). Speech recognition server 125 may process the spoken utterance to identify one or more keywords within the spoken utterance (act 220). For example, speech recognition server 125 may perform a technique known to those of ordinary skill in the art as "keyword spotting." Keyword spotting can be performed using, for example, such technologies as dynamic time warping (DTW), Gaussian mixture models (GMM) paired with hidden Markov model (HMM), artificial neural network (ANN), etc. Speech recognition server 125 may use other techniques for identifying the keywords. For example, speech recognition server 125 may process the spoken utterance recognizing each word and discarding information about all words except for keywords within the spoken utterance. In such an embodiment, speech recognition server 125 may create a file separate from the audio file that will be referred to herein as a meta tag file. The meta tag file may include the keywords along with either the location of the keyword within the audio file (i.e., the spoken utterance) or the temporal location of the keyword within the audio file. If the keyword is a delineating keyword, the meta tag file may include either the start and stop locations for the portion of the audio file to be processed or the start and stop times of the portion of the audio file to be processed. The meta tag file can include other information as well, including the time and place of creation, the author, the phone number, and the type of device used for creating the message. This information can later be used to shape the dynamically generated rendering of the message.

Once speech recognition server 125 recognizes the keywords, speech recognition server 125 may process the audio file (act 230). The audio file, which may be a stream of audio data, could be processed in real-time or the audio file may be saved and processed at a later time. For example, if a user wishes to insert a doorbell sound effect, the user may say "Do you ever answer your mail? insert doorbell effect." Speech recognition server 125 may recognize the spoken words "insert doorbell effect" as a keyword/keyword combination. The keyword could be a single word or a combination or words as in the present example. Speech recognition server 125 may process the audio file by removing the spoken words "insert doorbell effect" and replace these words with a separate file that contains a doorbell audio file. Thus, speech recognition server 125 may create a new audio file. Speech recognition server 125 may pass the audio file to message server 120 and message server 120 may save the message to the recipient's profile. In embodiments where the message author and the message recipient use separate telephony networks, the first telephony network may pass the message to the second telephony network and the second telephony network may direct the message to a storage location associated with the recipient's profile.

In other embodiments, a meta tag file may be created and the spoken utterance audio file may be saved without processing the audio file according to the functions associated with the keywords/combinations. The spoken utterance audio file may be saved with the keywords still included or may be saved after the keywords have been parsed. In this embodiment, message server 120 may store the files and upon retrieval for playback, message server 120 may direct the files to speech recognition server 125 for processing. Speech recognition server 125 may access the meta tag file and determine the function associated with each keyword. Speech recognition server 125 may retrieve each function and process the audio file according to the function. Once the file is processed, the processed audio file is provided to the VOIP phone (e.g., VOIP phone 105A or 105B) or gateway 135 and played back on the recipient's phone 105C.

Figure 3:
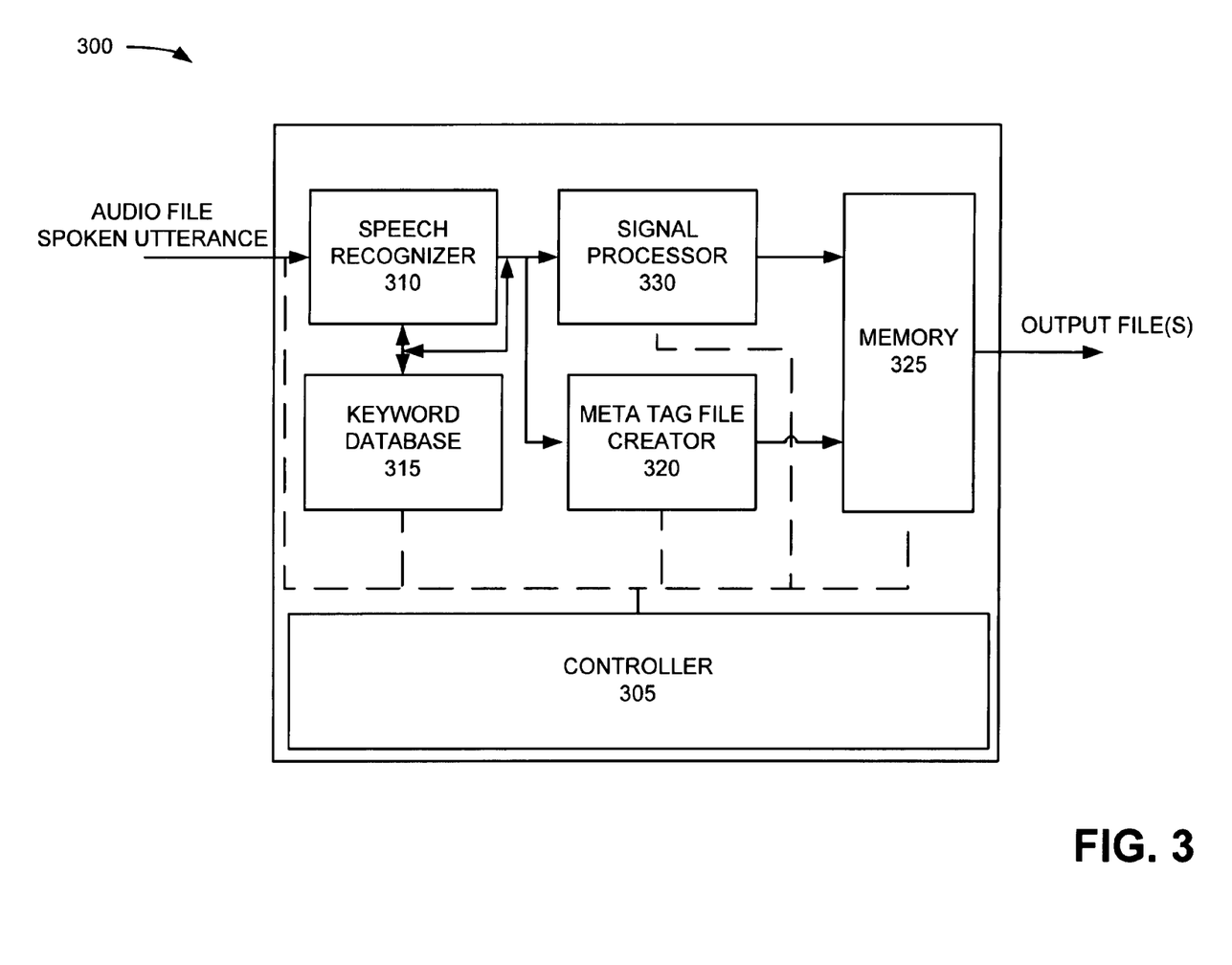
FIG. 3 shows a block diagram of a processing module for processing spoken utterance audio files having keywords.

FIG. 3 shows a block diagram of a processing module 300 for processing spoken utterance audio files having keywords. Processing module 300 may be located within speech recognition server 125 or another device in system 100. As illustrated, processing module 300 may include a controller 305 that provides instructions to each of the modules. Among other functions, controller module 305 can indicate the type of speech processing to perform, the speech technology for parsing the keywords from the audio file, whether a meta tag file should be created, and/or whether the audio should be processed based upon the function associated with the keywords. Processing module 300 may receive the spoken utterance audio file at an input and controller module 305 may cause the spoken utterance audio file to be passed to a speech recognizer module 310. Speech recognizer module 310 may access a voice recognition keyword database 315. Speech recognizer module 310 may use a speech recognition program to process the spoken utterance audio file, the result of which may be passed to signal processor 330. Speech recognizer module 310 may compare the processed speech to the keywords from database 315 to identify any keywords in the speech. Controller module 305 can signal that a meta tag file should be created using a meta tag file creator module 320.

As speech recognizer module 310 identifies the keywords, the keywords and the location (position within the audio file or temporal location) of the keywords within the audio file are passed to meta tag file creator module 320. Meta tag file creator module 320 may create a file based upon the keywords and location of the keywords within the audio file. Meta tag file creator 320 may access voice recognition keyword database 315 to gather additional information regarding the keywords. For example, meta tag file creator 320 may obtain an audio file to be inserted and store this audio file within the meta tag file in, for example, memory 325. Meta tag file creator 320 may obtain the signal processing parameters or a processing program associated with the keyword and can store the parameters or program in the meta tag file within memory 325. Meta tag file creator module 320 may also communicate with controller module 305 to obtain the identity of the author of the audio file, the location at which the audio file was created, and/or any software/hardware configuration necessary for processing the audio file. Some or all of this information can also be saved in the meta tag file. This information allows for dynamic changes to occur based upon individual settings. For example, if a spoken utterance was "add echo effect John are you there end echo effect," the meta tag file may indicate that the entire audio file with the exception of the keyword combination should be processed using echo. The author's intent may be to add echo to the file using a special echo signal processing program. The recipient may be located in a separate telephony network that does not include the special program. However, the recipient's telephony network may include a program for echo and the recipient's telephony network could process the audio file using the echo program of the recipient's computer system. Thus, the audio file may be dynamically processed by the recipient's computer system.

In other similar scenarios, the recipient may reprogram the function associated with a keyword. As in the previous example, the keyword may call for echo, but the recipient may associate an echo keyword with a reverb function. By separating the audio file from the keywords in the meta tag file, dynamic processing and reprogramming of the audio file are possible. In addition, the keywords may be dynamically processed according to time. For example, a keyword combination may be a seasonal theme and depending on the calendar date, a different theme may be dynamically rendered upon playback.

In other embodiments, a keyword combination may be used to apply a digital signal processing effect without requiring a closing keyword. For example, the keyword combination, "apply echo effect" may indicate that an echo effect should be applied to the entire spoken utterance no matter where it appears in the spoken utterance. In a different embodiment, the keyword combination "apply echo effect" may indicate that the echo effect should be applied to the remainder of the spoken utterance.

Figure 4A:
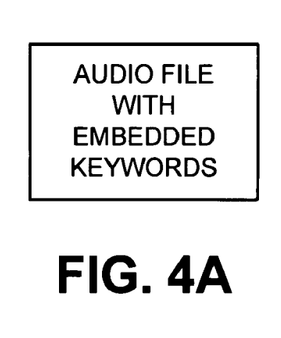
FIGS. 4A-D are a series of block diagrams representing the different output files that may be sent to a recipient.

FIGS. 4A-D are a series of block diagrams representing the different output files that may be sent to a recipient. In FIG. 4A, the author creates the spoken utterance audio file that includes keywords. The author's telephony network can send this file to the recipient's telephony network for processing. The recipient's telephony network may parse/identify the keywords and process the audio file for playback by the recipient. This type of output file may be preferable if the author's network bandwidth/processing power is constrained or the author's network lacks a speech processing server.

Figure 4B:
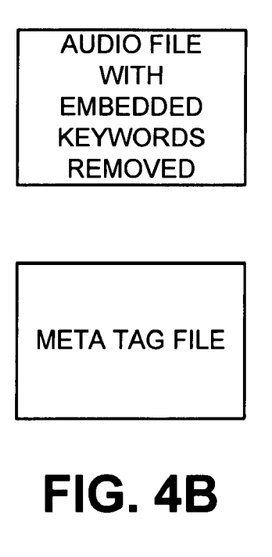

In FIG. 4B, two files are output and sent to the recipient's telephony network. The spoken utterance audio file may be parsed by a speech recognition engine, where the keywords are removed from the audio file. This file (i.e., the spoken utterance audio file with the keywords removed) may be sent to the recipient's telephony network. A meta tag file may also be created to identify the keywords and the location of the keywords within the audio file. The meta tag file may indicate the original length of the audio file and the present length of the audio file with the keywords removed as well as the start and stop points within the audio file for the keywords. This file may also be passed to the recipient's telephony network. This output may be preferred if the recipient's telephony network does not include a speech recognition engine, but does have the capability of performing signal processing or adding audio files to the original speech audio file.

Figure 4C:
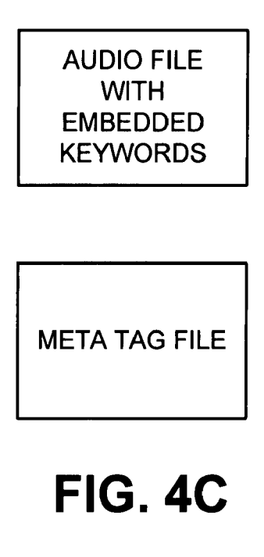

FIG. 4C shows another variation in which two files are distributed to the recipient's telephony network. The first file is the audio file as originally recorded including the keywords. The second file is the meta tag file. This embodiment provides the recipient's telephony network with the maximum possible information and allows for dynamic changes to the audio file.

Figure 4D:
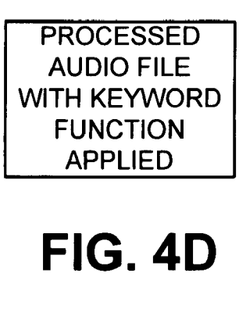

The output file of FIG. 4D is a processed audio file. The keywords of the original file are identified and parsed from the audio file and then the audio file is processed using the function(s) associated with the keywords. As previously stated, a sound or new audio file may be added to the original audio file or the audio file may be processed using an effect (e.g., reverb, echo, pitch shifter, low pass filter, etc.). The resulting file is provided to the recipient's telephony network. The embodiment of FIG. 4D may be preferable where the recipient's telephony network does not include a speech recognition server, since only the final audio file is provided.

Figures 5A, 5B:
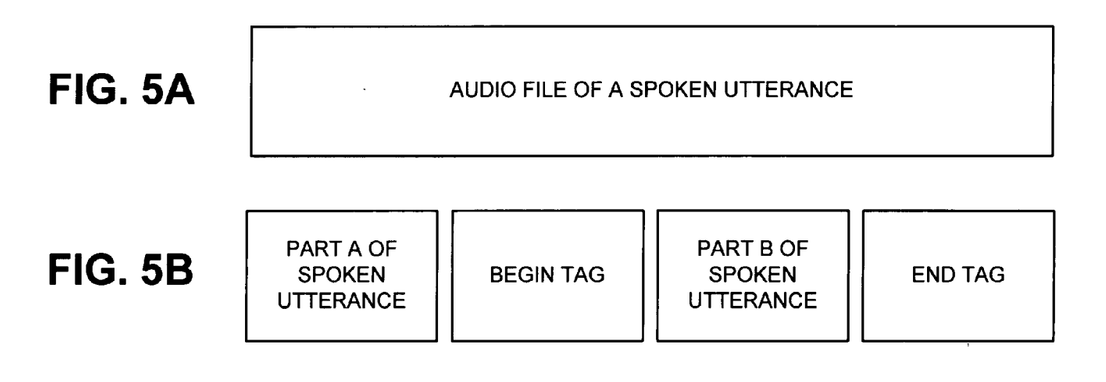
FIGS. 5A-C show a series of block diagrams representing various states of the spoken utterance audio file during processing.
Figure 5C:
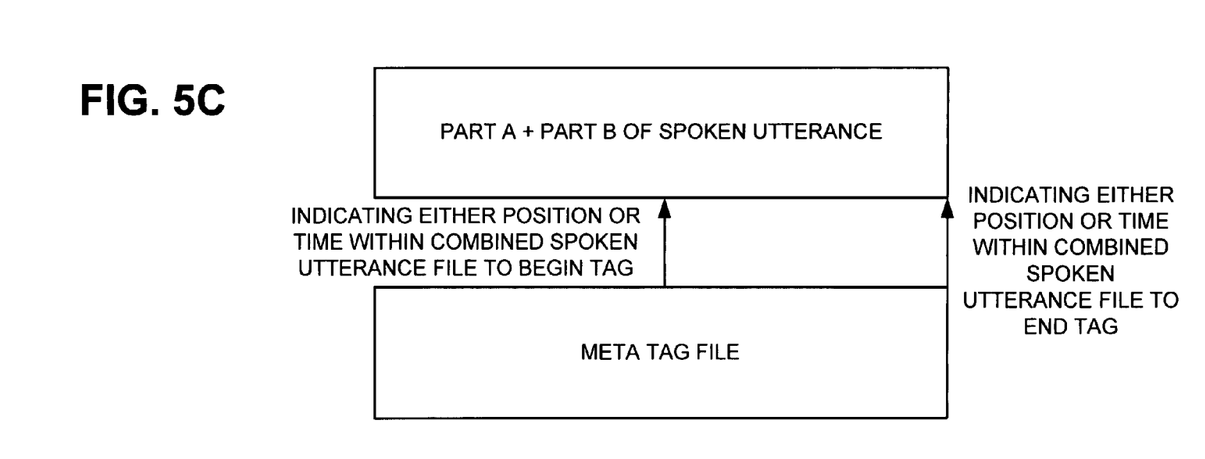

FIGS. 5A-C show a series of block diagrams representing various states of the spoken utterance audio file during processing. The spoken utterance of this embodiment includes a keyword combination having a beginning and an ending position. FIG. 5A shows a single block representing the spoken utterance audio file including any keywords as created by the author.

FIG. 5B shows sections of the spoken utterance audio file after the keywords have been identified. In this example, a keyword combination is provided, as indicated by the begin tag and end tag that border a part (part B) of the spoken utterance. There are two parts to the spoken utterance audio file (Part A and Part B) and only Part B is to be processed using the function associated with the keyword. An example of such a keyword combination may be "begin pitch shift" and "end pitch shift." After processing, Part B of the spoken utterance would be at a different pitch than part A.

FIG. 5C shows the audio file where the keywords are removed from the audio file. Part A and Part B of the audio file are connected together. FIG. 5C also shows a meta tag file that includes arrows representing the position within the audio file where processing should occur. There is an indicator (represented by an arrow) of the beginning of Part B of the audio file and an indicator of the end of Part B of the audio file. The recipient's telephony network would process Part B using the function associated with the keyword in the meta tag file.

Figure 6A:
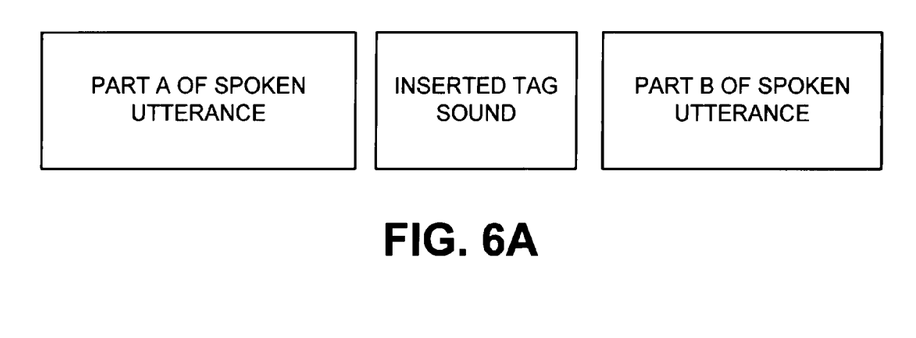
FIGS. 6A and 6B show a series of block diagrams representing various states of a spoken utterance audio file that includes a keyword combination for adding in an additional audio file.
Figure 6B:
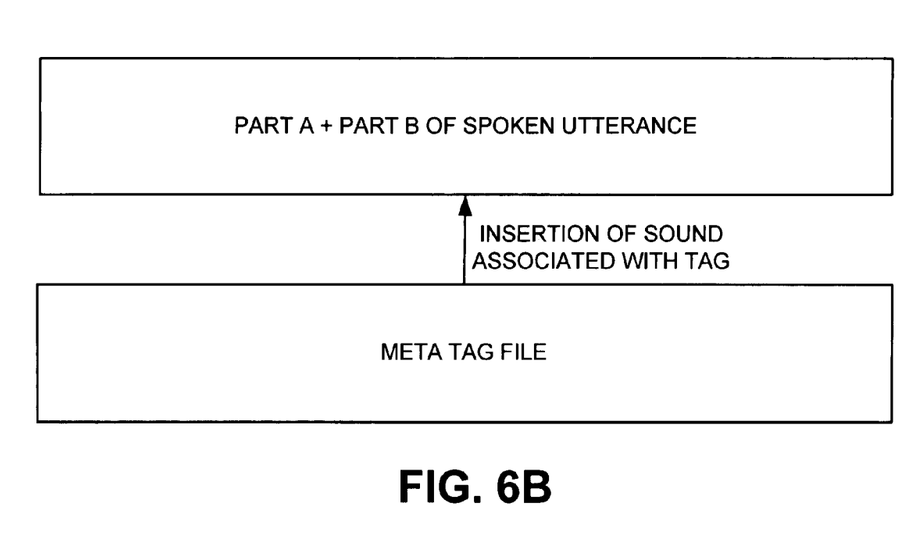

FIGS. 6A and 6B show a series of block diagrams representing various states of a spoken utterance audio file that includes a keyword combination for adding in an additional audio file. FIG. 6A shows the parsed audio file where the keyword combination is identified. The audio file includes three parts: Part A, the keyword combination, and Part B. In this embodiment, the keyword is associated with a sound to be added to the file when played back. An example of such a keyword combination is "tag chaching." The keywords "tag chaching" are associated with an audio file that upon playback creates the sound of a cash register opening. Other keyword combinations may add sound effects or pre-recorded spoken commentary to the spoken utterance audio file.

FIG. 6B shows the recombined sections of the spoken utterance (Part A and Part B) with the keyword(s) removed. Additionally, the meta tag file includes an arrow pointing to the location within the recombined audio file where the audio file associated with the keyword combination should be inserted.

CONCLUSION

Implementations consistent with the principles of the invention allow a user to verbally add keywords and phrases corresponding to specific audio-related effects to a spoken utterance, so that, upon playback, the effects occur in the audio.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while a series of act has been described with respect to FIG. 2, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for creating an audio file from a spoken utterance of a user, the method comprising:
    performing speech recognition on the spoken utterance to identify a verbally-added keyword or keyword combination from the spoken utterance;
    wherein the verbally-added keyword or keyword combination is associated with an audio effect to be performed on the spoken utterance to generate the audio file; and
    performing the audio effect on at least a portion of the spoken utterance to create the audio file.

2. The method according to claim 1, further comprising:
    removing the verbally-added keyword or keyword combination from the spoken utterance in creating the voice file.

3. The method according to claim 1, further comprising:
    sending the audio file to a message system associated with a recipient;
    audibly playing the audio file for the recipient.

4. The method according to claim 1, wherein
    the audio effect is to insert a sound or new audio file into the spoken utterance; and
    wherein, the performing the audio effect includes:
    inserting the sound or the new audio file into the spoken utterance to create the voice file.

5. The method according to claim 4, wherein the sound is inserted into the spoken utterance at a location within the spoken utterance where the verbally-added keyword or keyword combination was located.

6. The method according to claim 1, wherein, the audio effect is a digital signal processing effect.

7. The method according to claim 6, wherein, the digital signal processing effect includes a reverb effect.

8. The method according to claim 6, wherein, the digital signal processing effect includes an echo effect.

9. The method according to claim 6, wherein, the digital signal processing effect includes a pitch shifter.

10. The method according to claim 6, wherein, the digital signal processing effect includes a low pass filter.

11. A method for processing a spoken utterance according to an audio effect associated with verbally-added keywords in the spoken utterance, the method comprising:
    identifying an opening keyword and a closing keyword from the spoken utterance, the opening and closing keywords being associated with an audio effect to be performed on the spoken utterance;
    wherein, the opening and closing keywords are verbally conveyed in the spoken utterance;
    executing the audio effect to change at least one audible characteristic of a portion of the spoken utterance temporally located between the opening and closing keywords.

12. The method according to claim 11, further comprising:
    creating an audio file from the spoken utterance with the audio effect and without the opening and closing keywords.

13. A method of creating a meta tag file associated with a spoken utterance, the method comprising:
    identifying a verbally-added keyword from the spoken utterance using speech recognition;
    wherein the verbally-added keyword is associated with an audio effect to be performed on the spoken utterance;
    identifying a temporal position of the verbally-added keyword in the spoken utterance; and creating a meta tag file that is associated with the spoken utterance, the meta tag file including an identifier of the temporal position and an identifier of the verbally-added keyword.

14. The method according to claim 13, further comprising, creating a text file of the spoken utterance after performing speech recognition to identify the verbally-added keyword;

parsing the text file to identify the verbally-added keyword from the text file.

15. The method according to claim 13, wherein, the meta tag file includes a start and stop location of the portion of the spoken utterance on which the audio effect is to be performed.

16. The method according to claim 13, wherein, the meta tag file includes a start and stop time of the portion of the spoken utterance on which the audio effect is to be performed.

17. The method according to claim 13, further comprising:

removing the verbally-added keyword from the spoken utterance; and saving, in memory, the spoken utterance without the verbally-added keyword in a spoken utterance file.

18. A method for creating an audio file from a spoken utterance of a user, the method, comprising:

identifying a verbally-added keyword from the spoken utterance;

wherein the verbally-added keyword or keyword combination is associated with an audio effect to be performed on the spoken utterance to generate the audio file;

identifying a temporal position of the verbally-added keyword in the spoken utterance;

creating a meta tag file that is associated with the spoken utterance, the meta tag file including an identifier of the temporal position and an identifier of the verbally-added keyword;

performing the audio effect on at least a portion of the spoken utterance to create the audio file;

audibly playing the audio file.

19. The method according to claim 18, further comprising: saving the audio file to memory for future playback.

20. The method according to claim 18, wherein, the meta tag file includes a start and stop location of the portion of the spoken utterance on which the audio effect is to be performed.

21. The method according to claim 18, wherein, the meta tag file includes a start and stop time of the portion of the spoken utterance on which the audio effect is to be performed.

22. The method according to claim 18, wherein, the audio effect is a digital signal processing effect.

23. The method according to claim 18, further comprising: digitizing the spoken utterance; and
removing the keyword from the spoken utterance.

24. The method according to claim 18, wherein, the audio effect is to insert a sound or new audio file into the spoken utterance;

wherein, the performing the audio effect includes: inserting the sound or the new audio file into the spoken utterance to create the voice file; and wherein the sound is inserted into the spoken utterance at a location within the spoken utterance where the verbally-added keyword was located.

25. A system for creating an audio file from a spoken utterance of a user, the system, comprising:

means for, performing speech recognition on the spoken utterance to identify a verbally-added keyword or keyword combination from the spoken utterance;

wherein the verbally-added keyword or keyword combination is associated with an audio effect to be performed on the spoken utterance to generate the audio file;

means for, performing the audio effect on at least a portion of the spoken utterance to create the audio file.

26. A system for creating an audio file from a spoken utterance of a user, the system, comprising:

means for, receiving a spoken utterance;

means for, identifying a verbally-added keyword from the spoken utterance;

wherein the verbally-added keyword or keyword combination is associated with an audio effect to be performed on the spoken utterance to generate the audio file, the audio effect begin a digital signal processing effect;

means for, identifying a temporal position of the verbally-added keyword in the spoken utterance;

means for, creating a meta tag file that is associated with the spoken utterance;

wherein, the meta tag file includes a start and stop time of the portion of the spoken utterance on which the audio effect is to be performed and an identifier of the verbally-added keyword;

means for, performing the audio effect on at least a portion of the spoken utterance to create the audio file;

means for, audibly playing the audio file.

* * * * *

UNITED STATES PATENT AND TRADEMARK OFFICE
CERTIFICATE OF CORRECTION

PATENT NO. : 7,644,000 B1  
APPLICATION NO. : 11/319447  
DATED : January 5, 2010  
INVENTOR(S) : Nikko Strom Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Sixteenth Day of November, 2010

David J. Kappos  
*Director of the United States Patent and Trademark Office*